428-335 SR
10/28/86 OR RE 32,270

United States Patent [19]

Murray, Jr.

[11] E Patent Number: Re. 32,270

[45] Reissued Date of Patent: Oct. 28, 1986

[54] POLYESTER COATED PAPERBOARD FOR FORMING FOOD CONTAINERS AND PROCESS FOR PRODUCING THE SAME

[75] Inventor: Lee J. Murray, Jr., Appleton, Wis.

[73] Assignee: James River-Norwalk, Inc., Norwalk, Conn.

[21] Appl. No.: 574,668

[22] Filed: Jan. 27, 1984

Related U.S. Patent Documents

Reissue of:

[64] Patent No.: 4,147,836
Issued: Apr. 3, 1979
Appl. No.: 891,053
Filed: Mar. 28, 1978

U.S. Applications:

[63] Continuation of Ser. No. 243,359, Mar. 13, 1981, abandoned, which is a continuation of Ser. No. 104,554, Jan. 8, 1980, abandoned.

[51] Int. Cl. ..... B32B 27/10; B29C 19/04; B05D 3/06

[52] U.S. Cl. ..... 428/335; 156/221; 156/224; 156/244.13; 156/244.17; 156/244.23; 220/457; 220/458; 220/469; 427/39; 428/35; 428/481

[58] Field of Search ..... 428/481, 35, 480, 482, 428/500, 335, 349; 427/39; 162/135; 156/221, 224, 272, 274, 244.17, 244.23, 380, 244.13; 229/3.5 R, 30; 220/457, 458, 459; 204/165, 168

[56] References Cited

U.S. PATENT DOCUMENTS

| | | | |
|---|---|---|---|
| 3,318,748 | 5/1967 | Hurst | 156/244 |
| 3,448,000 | 6/1969 | Paquin et al. | 156/272 |
| 3,484,275 | 12/1969 | Lewicki, Jr. | 162/135 |
| 3,498,865 | 3/1970 | Paquin et al. | 156/244.17 |
| 3,904,104 | 9/1975 | Kane | 156/244.23 |
| 3,924,013 | 12/1975 | Kane | 156/244.23 |
| 3,939,025 | 2/1976 | Kane | 428/481 |
| 3,967,998 | 7/1976 | Kane | 428/481 |
| 4,026,458 | 5/1977 | Morris et al. | 229/30 |
| 4,028,551 | 6/1977 | Thompson | 204/168 |
| 4,029,876 | 6/1977 | Beatty et al. | 204/165 |
| 4,048,736 | 9/1977 | Castleman et al. | 428/500 |
| 4,147,836 | 4/1979 | Middleton et al. | 428/481 |

*Primary Examiner*—Thomas J. Herbert
*Attorney, Agent, or Firm*—William A. Aguele; Thomas H. Whaley

[57] ABSTRACT

A coated paperboard product and a process for producing the same which includes corona discharge treatment of a paperboard surface and subsequent extrusion of molten polyester thereon. The resulting product has a very high degree of adhesion between the paperboard and polyester layers, and is capable of being utilized for forming pressed food trays which can be subjected to oven cooking temperatures.

5 Claims, 2 Drawing Figures

POLYESTER COATED PAPERBOARD FOR FORMING FOOD CONTAINERS AND PROCESS FOR PRODUCING THE SAME

Matter enclosed in heavy brackets [ ] appears in the original patent but forms no part of this reissue specification; matter printed in italics indicates the additions made by reissue.

*This application is a continuation of application Ser. No. 243,359, filed Mar. 13, 1981, now abandoned, which was, in turn, a continuation of application Ser. No. 104,554, filed Jan. 8, 1980, now abandoned.*

BACKGROUND OF THE INVENTION

1. Field of the Invention

This invention pertains generally to the field of oven heatable plastic coated paperboard containers and to processes for producing the same.

2. Description of the Prior Art

The most common containers for convenience foods which are to be heated within the container are formed of thin sheet aluminum or layers which include aluminum foil. Because of the relative high cost of such containers and because they generally cannot be used in microwave oven cooking, substantial efforts have been made to provide plastic coated paperboard cartons which can withstand oven heating.

Polyethylene is often used as a coating material for paperboard since it has good moisture impermeability and is easily adhered to many types of paperboard. However, polyethylene and many other types of common plastic coating materials do not have the resistance to melting at high temperatures required for very hot oven heating. Such coating polymers must also have adequate structural strength and abrasion resistance, as well as being compatible with food products.

Polyethylene terephthalate polyester is a particularly satisfactory coating material for oven heatable trays since it has a high melting temperature and good structural strength, and is compatible with and unaffected by most food products. However, it is well known in the art that it is difficult to obtain good bonding of polyethylene terephthalate to other materials and particularly to paperboard. In the past, such bonding has been accomplished by the use of adhesives or primers applied over the paperboard before a hot melt extrusion of the polymer is applied to the paperboard. The use of primers and adhesives is undesirable in packaging foods because such materials are capable of migrating into the contents of the food package.

A procedure for extrusion coating polyethylene terephthalate onto paperboard without the use of primers is shown in U.S. Pat. No. 3,924,013 to Kane, in which the paperboard is subjected to heating prior to being contacted with the hot melt extrusion. While such a process may be adequate for certain purposes, it is undesirable were the coated paperboard is to be die pressed into deep formed trays, since heating the paperboard reduces its moisture content and embrittles the board to thereby make it more subject to tearing upon die pressing. Deep pressed heatable containers are especially preferred since they do not require the use of adhesives or heat seals in order to form the edge walls of the tray. Trays formed by adhesively connecting the sides of the tray together or by heat sealing them together are subject to separation at the very high temperatures of oven heating, and the adhesive material may migrate into the food product. Pressing allows formation of smooth radius contoured corners, rather than sharp adhesively joined corners, which provides good heat distribution characteristics during oven heating.

SUMMARY OF THE INVENTION

The coated paperboard formed in accordance with the invention is especially suited to forming deep pressed trays which can be filled with food products and oven heated to temperatures of 400° F. The polyethylene terephthalate coating on the interior surface of the paperboard has a high degree of adhesion to the paperboard at initial room temperatures, at the freezing temperatures at which the food is stored, and at the 300° F. to 400° F. oven temperatures at which the food is heated. The coating is applied to the paperboard without the use of primers or adhesives which thereby eliminates a potential source of contamination of the food.

The paperboard substrate is selected to have good resistance to oven heating, low levels of contaminants which inhibit proper adhesion of the coating, and surface roughness characteristics which allow strong adherence of the coating to take place. The paperboard substrate, which has a thickness in the preferred range of 0.015 to 0.025 inch, is passed through a corona discharge device such that the selected surface of the paperboard receives a selected corona discharge energy sufficient to allow adhesion of the coating to the paperboard of at least 90 grams per linear inch. Generally, the corona energy density required will be at least 0.35 joules per square inch and preferably 2 to 5 joules per square inch. Surface treatment at this energy level prepares the surface and reduces the effect of contaminants in the surface which would tend to inhibit adhesion of the coating.

The corona treated paperboard is passed into a nip formed between a chill roll and a backup roll while a hot melt extrusion of polyethylene terephthalate is simultaneously passed into the nip between the corona treated side of the paperboard and the chill roll. The hot melt extrusion exits from the extruder at an initial temperature between 580° F. and 640° F. through an air gap before insertion into the nip at substantially the same speed as the forward moving paperboard. The air gap is adjusted such that the temperature of the extrusion at the time of contact with the paperboard is above the melting point of the polyethylene terephthalate such that the extrusion will still be in a substantially fluid state at the time that it contacts the paperboard so as to flow into the fibrous surface of the paperboard. At normal ambient temperatures (65° F. to 80° F.), the air gap and paperboard speed are preferably adjusted to provide a polymer residence time in the air gap of about 0.05 to 0.15 seconds. The chill roll is maintained at a temperature close to ambient so as to quickly chill the extrusion coating below its glass transition temperature to a substantially non-flowing state by the time the laminate of paperboard and coating leaves the chill roll.

Coated paperboard formed by the aforementioned process has adhesion between the polyethylene terephthalate coating and the underlaying paperboard of at least 90 grams per inch and preferably 200 to 500 grams per inch width. It has been found that adhesion levels generally increase with increases in corona energy density and in the thickness of the extrusion coating, but that adequate adhesion can be obtained at lower corona energy and more convenient coating thicknesses *in a*

*range of from about 0.5 mil to about 1.5 mils* where the paperboard surface roughness is greater than selected minimum levels and the organic contaminants on the surface are below selected maximum concentrations.

For forming of deep die pressed trays, it is preferred that the moisture content of the paperboard be at least 10% by weight. Generally, the initial moisture content of the paperboard is not substantially effected by the corona treatment or extrusion process so that if adequate moisture is present in the initial paperboard, it will be maintained through the entire process. However, where additional moisture is required, the uncoated side of the paperboard can have a wetting liquid applied thereto, with the entire coated paperboard laminate being enclosed in a moisture proof wrapping for a period of several hours to allow the moisture to reach equilibrium distribution within the paperboard. Various types of paperboard substrates which have good resistance to heating can be utilized, such as boards formed from solid bleached sulfate pulps.

The exterior surface of the paperboard can be printed to provide decoration and product advertising material, while the polyethylene terephthalate coating itself can be pigmented with any desired color for aesthetic enhancement as well as concealing any browning of the paperboard that may take place at the high oven temperatures.

Further objects, features, and advantages of the invention will be apparent from the following detailed description taken in conjunction with the accompanying drawings showing coated paperboard material suitable for forming pressed heatable food trays and a process for producing the same.

DESCRIPTION OF THE PREFERRED EMBODIMENTS

Figure 1:
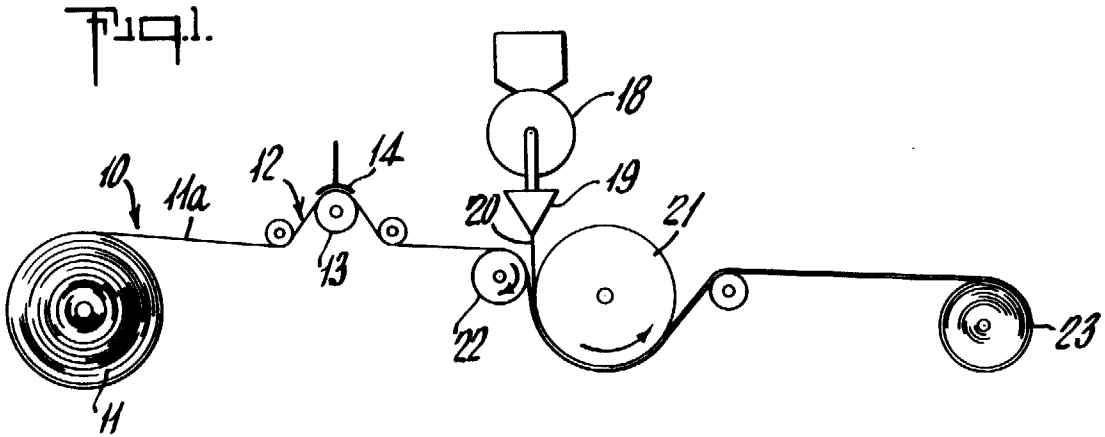
FIG. 1 is a schematic view of apparatus for treating and coating the paperboard.

Referring now more particularly to the drawings, wherein like numerals refer to like parts in both views, a preferred embodiment of an apparatus for forming the coated paperboard of the invention is shown generally at 10 in FIG. 1. For exemplary purposes, a roll 11 of paperboard is shown which is unwound and passed through a corona discharge device 12. The corona discharge device 12 is shown only in schematic form in FIG. 1, with the plates of the device being represented by the dielectric roller 13 and the curved plate or shoe 14. The generator which provides the corona discharge voltages between the plates 13 and 14 is not shown in FIG. 1. The shape of the plate or shoe 14 is preferably curved to match the periphery of the roller 13 contacting the paper so as to provide a substantially uniform corona field to the paperboard. It is preferred that the corona discharge device have a capacity to provide corona discharge wattages of 100 to 600 watts per inch of width at 9.6 KHz over an air gap of approximately 0.060 inches. As explained below, the device 12 has the capacity to treat the side 11a of the paperboard facing the curved plate 14 with a corona energy density of at least 2 to 6 joules per square inch of paperboard surface at production speeds generally in the range of 100 to 500 ft. per minute.

The paperboard stock provided from the roll 11 may be formed in conventional manufacturing processes but is preferably formed with minimal additives or impurities and is uncoated on at least the upper surface 11a thereof.

It has been found that the effect of the corona treatment of the surface of the paperboard endures for a period of at least 10 days under normal temperature and humidity conditions following the corona treatment. Thus, although the paperboard is shown immediately being passed into extrusion coating equipment in FIG. 1, it is understood that the paperboard could be rolled up after corona treatment and extrusion coated at a later time.

The extrusion coating equipment shown in FIG. 1 includes an extruder 18 which feeds the hot molten polyethylene terephthalate into a sheet forming die 19. The molten extruded film 20 exiting from the die 19 passes through an air gap and thence into a nip formed between a chrome plated chill roll 21 and a backup roll 22. The paperboard is simultaneously passed into the nip such that the corona treated surface 11a of the paperboard comes into contact with the film in the nip. As the molten film 20 reaches the nip, its temperature has decreased to a temperature somewhat above the melting point of the polyethylene terephthalate material (m.p. approximately 480° F.). At this temperature, the film is still sufficiently molten that it can flow and conform to the surface fibrous of the paperboard, while quickly cooling below its glass transition temperature (approximately 179° F.) and solidifying by contact with the cooler chill roll 21 which is preferably maintained at a temperature close to ambient. The now solidified coating easily parts from the chrome plated chill roll and allows the laminate of paperboard and coating to be rolled up on a wind-up roll 23.

Figure 2:
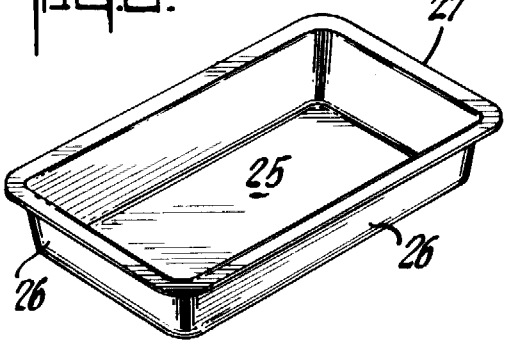
FIG. 2 is an external perspective view of a pressed tray formed from the coated paperboard of the invention.

The finished coated paperboard product is especially adapted to use in forming press formed one-piece trays. Such trays are formed by placing a blank of the laminate with the coated side up over a female die and pressing downwardly thereon with a mating heated male die. An example of such a tray construction is shown in FIG. 2, wherein the finished tray includes a bottom panel 25, integrally connected side panel 26, and an integrally connected top flange 27. Because the die forming of such trays requires the paperboard to bend and stretch easily, it is important to the proper formation of the trays that the paperboard have a relatively high moisture content, in the range of 10% by weight or more. It is noted that in carrying out the process of the invention, the moisture content of the board is not substantially reduced. Furthermore, the process does not require heating of the paperboard in any manner, which minimizes the possibility of oxidizing or embrittling the fibers of the paperboard, or destroying inter-fiber bonds. If the initial paperboard, or the roll 11 does not have sufficient moisture content, the finished coated paperboard in the roll 23 may have a wetting liquid applied to the uncoated surface thereof which is allowed to seep through the paperboard over a period of time, preferably 10 to 24 hours. In order to minimize evaporation of the moistened board, it is preferable to wrap the moistened board in a polyethylene or other moisture proof wrapping until the paperboard is formed into trays.

High adhesion of the polyester coating to the paperboard is desired, preferably being a minimum of 90 to 150 grams per inch as measured transversely at a 180° pull angle and at a 5 inch per minute rate, or to the point were fiber tearing in the paperboard occurs. 90 grams per inch adhesion is the minimum acceptable level at which adhesion is maintained during die pressing, and a minimum of 150 grams per inch is preferred to prevent spontaneous delamination if the coated board is die cut. The factors most influencing adhesion are the degree of penetration of the polyethylene terephthalate into the paperboard, the roughness of the paperboard surface being coated, and the presence of chemical additives or contaminants in the paperboard. Generally, it has been found that the crystallinity of the laminated polyethylene terephthalate, and the commercial source of the polymer, do not substantially affect the adhesion of the coating to the paperboard.

The adhesive peel strength of the coating depends on both the mechanical and chemical aspects of the paperboard. The mechanical factors of the paperboard include the roughness of the paperboard surface and the fiber tearing strength of the paperboard in a direction toward its surface. These mechanical features affect the flow of molten or plastic polyethylene terephthalate into the paperboard surface at elevated temperatures and pressures as well as the spreading of peel forces over a wider area by the pulling of fibers. The roughness of the paperboard surface is the major contributor to the mechanical aspects of the final adhesion of the coating, and the roughness of the surface with the coating in situ increases with increases in the application weight of the coating. Additionally, less significant conditions which affect the flow of the extrusion into the paperboard are the polymer temperature at the time of contact with the paperboard, the laminating pressure at the nip between the back-up roll and the chill roll, and the contact time above the polymer melting point during laminating.

Chemical additives and contaminants in the paperboard also have been found to have a substantial effect on the strength of adhesion which is obtained. The strength of adhesion improves with decreasing concentrations of organic contaminants or additives, which can be measured quantitatively by the adsorption of an iodine stain applied to the paper. A positive relationship was found between the intensity of an iodine stain developed on the paperboard and the level of adhesion that could be developed when polyethylene terephthalate was extrusion laminated to the paperboard. The test is similar to one commonly used to detect the presence of organic compounds on thin-layer chromatography plates. The technique is effective in detecting materials such as oils, waxes, and certain paperboard additives such as wax and rosin size.

The stain test was carried out utilizing a Macbeth MS-2000 Spectrophotometer, a ceramic white plate standard provided with the Spectrophotometer, iodine crystals (Fisher Catalog No. I-36), and a rectangular developing tank (Fisher Catalog No. 5-718-16). The tests were conducted on paperboard which had been cut to sections of approximately 2 inches by 6 inches. 1 gram of iodine solid was emplaced in a glass exposure vessel which was covered for three hours to allow the iodine vapors to reach an equilibrium level. The paperboard samples were placed standing up in the exposure vessel and the vessel was covered for three hours to allow the iodine stain to develop. The samples were then removed and allowed to stand for three minutes to reduce excess iodine vapors, and the change in lightness-darkness ($\Delta L$) of the sample versus the white plate standard was read on the Spectrophotometer. The iodine stain test is a test of relative concentrations of contaminants, and exact test readings may be expected to vary with changes in test equipment and whiteness standard.

It has been observed that the corona treatment of the paperboard surfaces does not decrease the concentration of additives and contaminants, as measured by the iodine stain test, but rather apparently neutralizes the effect of the contaminants where their concentration is initially low. It is theorized that the corona treatment produces bonding sites on the additives and contaminants so that the polyester coating can bond thereto. Other possible, although less likely explanations for the enhancement of the bonding, are that the additives and contaminants are oxidized in the presence of the corona or that the corona produces active sites for adhesion on the cellulose fibers of the paperboard itself. While the corona treatment of the paperboard surface provides increased adhesion of the polyester coating on paperboard substrates in general, optimum adhesion is obtained where the paperboard substrate meets preferred conditions of roughness and sufficiently low levels of contaminants. The effect of these factors are set forth in the following examples which are illustrative of the invention.

EXAMPLES 1-9

Polyethylene terephthalate coatings were applied to corona treated paperboard in accordance with the process of the invention set forth above at varying corona treatment levels. The paperboard was provided from four separate types of solid bleached sulfate paperboard having different surface characteristics, with each run of paperboard being passed through the corona device (Pillar Model Components AB 1326-3(-) and AB 1418-4(-)) and the extrusion coater at the rate of 175 ft. per minute. Polyethylene terephthalate obtained from Eastman as Eastman 6857 resin was used to coat 7 samples of paperboard, while 2 samples of paperboard were coated with resin obtained from Goodyear under the designation Goodyear VPE-5792, to determine if the source of supply of the polyester affected adhesion. The polyester resin was thoroughly dried, and then heated in the extruder to an exit melt temperature of 640° F. The extruded film passed through an air gap of approximately 2 inches and into contact with the corona treated paperboard surface. The chrome plated chill roll was maintained at a temperature of 60° F. The results of these tests are given in Table 1 below. In this table, the base board thickness and the polyester thickness were determined by measurement after separation of the polyester from the board, except where separation could not be obtained without fiber tearing, in which case nominal theoretical thickness are provided based on the expected thickness of the polyester coating.

TABLE 1

| Sample | Board Basis Weight, lbs/rm 24 × 36 × 500' | Corona-joules/sq. in. | Iodine Stam (-ΔL) | Base Board thickness mils | Pendtsen roughness at 5 Kg | Polyester thickness (mils), Supplier | Adhesion Instron, polyester to board 180° ang., 5"/min., grams/25, 4 mm width |
|---|---|---|---|---|---|---|---|
| 1 | 199 | 3.41 | 37 | 16.0 | 188 | 1.31 Goodyear | 10–25 |
| 2 | 232 | 2.81 | 15 | 18.5 | 123 | 1.34 Eastman | 55–225 |
| 3 | 258 | 2.11 | 20 | 21.1 | 351 | 1.36 Goodyear | 120–380 |
| 4 | 256 | 3.61 | 20 | 21.8 | 351 | 1.50 Eastman | 125–375 |
| 5 | 231 | 2.81 | 15 | 18.5* | 123 | 1.50* Eastman | CNS |
| 6 | 191 | 3.73 | 25 | 15.0 | 94 | 1.51 Eastman | 20–110 |
| 7 | 193 | 3.73 | 25 | 13.8 | 94 | 1.67 Eastman | 75–140 |
| 8 | 193 | 3.73 | 25 | 14.0 | 94 | 1.78 Eastman | 75–110 |
| 9 | 211 | 2.76 | 37 | 16.6 | 188 | 2.14 Eastman | 175–275 |

CNS = Could not separate
*Estimated value

Since similar tests without corona treatment yielded very low to no adhesion of polyester coating to paperboard for all of the above samples, the test results indicate that corona treatment provides some additional adhesion under virtually all conditions. However, it is noted from a comparison of samples 1 and 9 that a very large increase in adhesion was obtained by increasing the thickness of the polyester coating to slightly over 2 mils from approximately 1.3 mils for paperboard having similar surface characteristics. Although different polyester suppliers were utilized for these two tests, the effect of the source of polyester is discounted, particularly in comparing the results of samples 3 and 4 wherein coating of two different sources of polyester on similar surfaces yielded similar adhesion results. The foregoing test results are exemplary of data which indicates that, for polyester coating of a thickness of 1.5 mils or less, it is highly preferred that the Bendtsen roughness at 5 Kg. (TAPPI standard T-479) be at least 100 for the paperboard surface, and that the contamination level of the paperboard surface as measured by the foregoing iodine stain response test be approximately 25 or less. Under such board surface conditions, corona treatment above minimal levels may be expected to provide substantial enhancement of adhesion. It is also seen from this data that adequate adhesion may be obtained by increasing the thickness of the extrusion coating which apparently increases penetration of the hot melt into the paperboard. However, coating thickness greater than approximately 1.5 mils are undesirable since the stiffness of the coating interferes with die press forming of trays.

EXAMPLES 10–14

The following examples illustrate the effect of varying levels of corona treatment on board surfaces having the preferred surface characteristics. The paperboard of sample 5 above was utilized. The paperboard in all samples was run through the extrusion equipment at a rate of 175 ft. per minute and coextruded with Goodyear VPE 5792 polyethylene terephthalate at an extrusion temperature of 640° F., exiting from the extrusion die through an air gap of 4½ inches before contact with the the paperboard surface. The chrome plated chill roll was maintained at a temperature of 60° F. and the nip pressure between the chill roll and the backup roll was 145 pli. The corona device was a Pillar model components AB 1326-3(-) and AB 1418-4(-).

With no corona treatment of the paperboard surface, the adhesion of the polyester to paperboard using an Instron tester at a 180° angle, 5 inches per minute, yielded adhesion fluctuating between 0 and approximately 90 grams per inch width. Samples 10–13 summarized in the table below were performed by first corona treating one surface of the paperboard to the energy density stated in the table, storing the paperboard for 10 days, and then extruding the polyester onto the treated surface thereof under the foregoing conditions. Sample 14 was obtained by running the paperboard at a rate of 175 ft. per minute continuously through the corona treater to the extrusion coating equipment.

TABLE 2

| Sample Identification | Corona level joules per square inch | Adhesion, Instron, polyester to board 180° angle, grams/25 4 mm width |
|---|---|---|
| 10 | 0.35 | 90–320 |
| 11 | 0.74 | 90–320 |
| 12 | 1.81 | 230–490 |
| 13 | 5.05 | 230–453 |
| 14 | 3.26 | 230–680 |

Substantially enhanced adhesion is thus obtained with corona treatment levels as low as 0.35 joules per square inch, and without regard to whether the corona treatment is applied immediately before extrusion coating or after an intervening period of time. It is seen that optimum adhesion is obtained with corona treatment levels of approximately 2 to 5 joules per square inch. It is noted however, that enhancement of the adhesion does take place at corona levels as low as 0.35 joules per square inch.

EXAMPLE 15

The paperboard specified above in Examples 10–14 was passed through the corona treater at a corona level of approximately 5 joules per square inch at 175 ft. per minute and directly into the extrusion coating apparatus. A hot melt was prepared consisting of a uniform misture of 80% by weight Eastman 6857 polyethylene terephthalate and 20% by weight particulate Ampacet 11171 white concentrate pigment. Extrusion of the melt onto the paperboard was carried out in accordance with the process set forth for Examples 10–14, except that the melt temperature was lowered from 640° F. to 590° F. to form an acceptable melt curtain with the blend. The required lowering of the melting temperature was due to the presence of low density polyethylene present as a pigment carrier. The resulting coating had a thickness of approximately 1 mil and good adhesion, as measured on the Instron tester at 180°, of approximately 300 to 600 grams per inch adhesion. The uncoated side of the laminate was moistened with water and a wetting agent, wrapped in polyethylene and stored for 24 hours, and then formed on a die press into a tapered tray having a top flange, similar to that shown in FIG. 2. The tray was filled with 10 ounces of spagetti and beef sauce, and a film lid of 92 gauge polyester coated on one side with Adcote 1189-36 adhesive was applied and heat sealed to the top of the tray. The filled tray was covered with aluminum foil and frozen 3 days at 0° F. Upon removal from the freezer, the foil was removed and the tray was heated in an electric oven at 375° F. for 35 minutes. Upon removal from the oven, the temperature of the product was checked and the contents were removed from the tray. The tray was examined for adhesion of the coating and scorching of the board. No delamination of the coating from the board was observed. There was slight to moderate scorching of the flange but no scorching of the tray at the area in contact with the product, and no observable scorching of the board in the areas covered by the pigmented polyester coating.

It is understood that the invention is not confined to the particular embodiments described herein as illustrative, but embraces all such modified forms thereof which come within the scope of the following claims.

[We claim] *I claim*:

[1. A process for producing coated paperboard material suitable for forming pressed heatable food trays, comprising the steps of:

(a) passing a web of paperboard material through a corona discharge device at a corona energy density level sufficient to subject the paperboard to an energy density of at least 0.35 joules per square inch of paperboard surface;

(b) passing the corona treated paperboard into a nip formed between a chill roll and a backup roll while simultaneously passing a hot melt extrusion of polyethylene terephthalate into the nip between the corona treated side of the paperboard and the chill roll, the hot melt extrusion exiting from the extrusion die at an initial temperature of between 580° F. and 640° F. through an air gap before insertion into the nip, the air gap distance being selected with respect to the speed of the paperboard and the ambient and chill roll temperatures such that the temperature of the extrusion at the time of contact with said paperboard is above its melting temperature and such that it is chilled below its glass transition temperature at the time that it leaves the chill roll to thereby facilitate separation therefrom.]

[2. A process for producing coated paperboard material suitable for forming pressed heatable food trays, comprising the steps of:

(a) passing a web of paperboard material through a corona discharge device to corona treat a surface of the paperboard to a selected energy density;

(b) passing the corona treated paperboard into a nip formed between a chill roll and a backup roll while simultaneously passing a hot melt extrusion of polyethylene terephthalate into the nip between the corona treated side of the paperboard and the chill roll, the thickness of the extrusion coating on the paperboard and the corona energy density on the paperboard surface being selected such that the adhesion between the extrusion coating and the paperboard is at least 90 grams per linear inch width as measured at a 180° pull angle at 5 inches per minute.]

[3. The process of claim 2 wherein the thickness of the extrusion coating on the paperboard is between 0.5 mil and 1.5 mils and the corona energy density applied to the paperboard is between about 0.35 joule per square inch and 5 joules per square inch, and wherein the paperboard is selected such that the corona treated surface thereof has a surface roughness above a minimum level and a concentration of organic contaminants below a maximum level such that the adhesion between the extrusion coating and the paperboard is at least 90 grams per linear inch as measured at a 180° pull angle at 5 inches per minute.]

[4. The process of claim 3 wherein the hot melt extrusion exits from the extrusion die at an initial temperature of between 580° F. and 640° F. through an air gap before insertion into the nip, the air gap distance being selected with respect to the speed of the paperboard and the ambient and chill roll temperatures such that the temperature of the extrusion at the time of contact with the paperboard is above its melting temperature and such that it is chilled below its glass transition temperature at the time that it leaves the chill roll to thereby facilitate separation therefrom.]

[5. The process of claims 1 or 2 wherein the paperboard is selected such that the corona treated surface has a surface roughness as determined by the Bendtsen test at 5 Kg of at least 100.]

[6. The process of claims 1 or 2 wherein the paperboard is selected such that the corona treated surface thereof has a level of impurities as detected by an iodine stain test on a Macbeth Ms-2000 Spectrophotometer relative to a white plate standard of less than 25.]

[7. The process of claims 1 or 2 wherein the paperboard is formed of solid bleached sulfate pulp.]

[8. The process of claims 1 or 2 wherein the paperboard has a moisture content of at least 6% by weight.]

[9. The process of claims 1 or 4 wherein the chill roll is maintained at a surface temperature between 60° F. and 120° F.]

[10. The process of claims 1 or 2 wherein the hot melt of polyethylene terephthalate has a particulate color pigment intermixed therewith.]

[11. The process of claims 1 or 2 including the additional step of applying water to the uncoated surface of the coated paperboard laminate and storing the moistened paperboard in a moisture proof container for 24 hours to allow moisture throughout the paperboard to reach at least 10% by weight.]

[12. A coated paperboard product made in accordance with the processes of claims 1 or 2.]

*13. A process for producing coated paperboard material suitable for forming pressed heatable food trays, comprising the steps of:*

*(a) passing a web of paperboard material through a corona discharge device at a corona energy density level sufficient to subject the paperboard to an energy density of at least 0.35 joules per square inch of paperboard surface;*

*(b) passing the corona treated paperboard into a nip formed between a chill roll and a backup roll while simultaneously passing a hot melt extrusion of polyethylene terephthalate into the nip between the corona treated side of the paperboard and the chill roll to produce a thickness of the extrusion coating on the paperboard of between 0.5 mil and 1.5 mils, the hot melt extrusion exiting from the extrusion die at an initial temperature of between 580° F. and 640° F. through an air gap before insertion into the nip, the air gap distance being selected with respect to the speed of the paperboard and the ambient and chill roll temperatures such that the temperature of the extrusion at the time of contact with said paperboard is above its melting temperature of about 480° F. and such that it is chilled below its glass transition temperature of about 179° F. at the time that it leaves the chill roll to thereby facilitate separation therefrom, said paperboard being selected such that the corona treated surface has a surface roughness, as determined by the Bendtsen test at 5 Kg, of at least 100, and a level of impurities, as detected by an iodine stain test ($\Delta L$) on a Macbeth MS-2000 Spectrophotometer relative to a white plate standard, of less than 25.*

*14. The process of claim 13 wherein said level of impurities, so detected, is about 15 to 25.*

*15. The process of claim 13, wherein said air gap distance and said paperboard speed are selected to provide a residence time of said extrusion in said air gap of from about 0.05 second to about 0.15 second.*

*16. In a process for producing coated paperboard suitable for forming pressed oven-heatable food trays, the steps comprising: passing a web of paperboard through a corona discharge device at a corona energy density level sufficient to subject said surface of said paperboard to an energy density of at least 0.35 joule per square inch thereof; passing the corona-treated paperboard into a nip formed between a chill roll and a backup roll, while simultaneously passing into the nip between the corona-treated side of said paperboard and the chill roll a hot melt extrusion, in a thickness of between 0.5 and 1.5 mils, of a polyethylene terephthalate resin having a melting point temperature of about 480°; causing said hot melt extrusion to exit from the extrusion die at an initial temperature of from about 580° F. to about 640° F., and to pass, before insertion into said nip, through an air gap distance so selected with respect to the speed of said paperboard and the ambient and chill roll temperatures that said extrusion is, at the time of contact with said paperboard, above said melting point temperature and in a substantially fluid state, so as to flow into said fibrous surface of said paperboard; and quickly chilling said extrusion below the glass transition temperature of said resin of about 179° F. at the time that it leaves the chill roll, said paperboard being selected such that the corona treated surface has a surface roughness, as determined by the Bendtsen test at 5 Kg, of at least 100, and a level of impurities, as detected by an iodine stain test ($\Delta L$) on a Macbeth MS-2000 Spectrophotometer relative to a white plate standard, of less than 25, the level of adhesion between said extrusion coating and said paperboard so attained being at least 90 grams per linear inch width, as measured at a 180 degree pull angle at 5 inches per minute.*

*17. A coated paperboard product made in accordance with the process of claims 13, 14, 15 or 16.*

* * * * *